No. 652,853. Patented July 3, 1900.
W. F. MAGILL.
CULTIVATOR.
(Application filed Feb. 15, 1900.)
(No Model.)
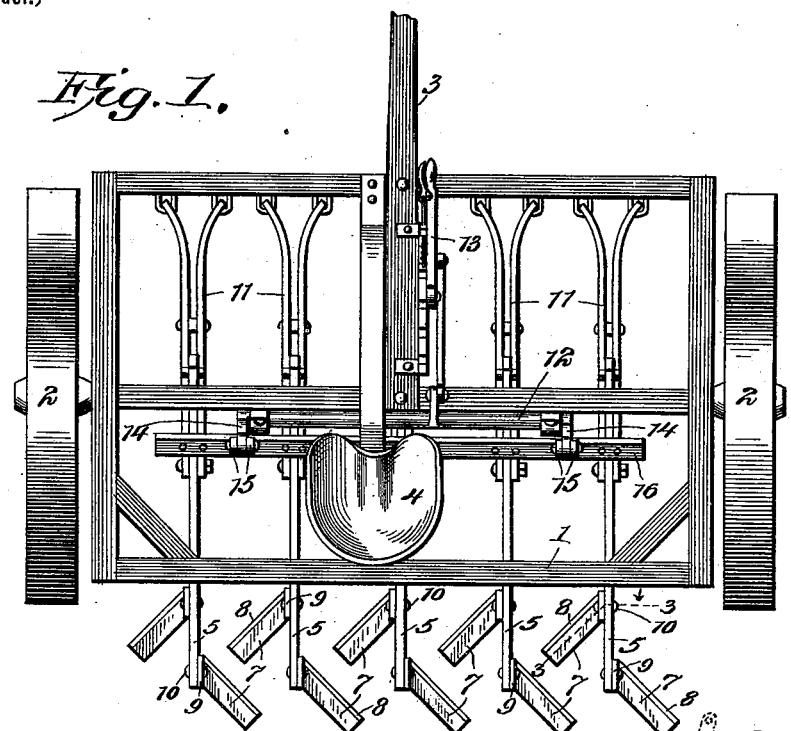
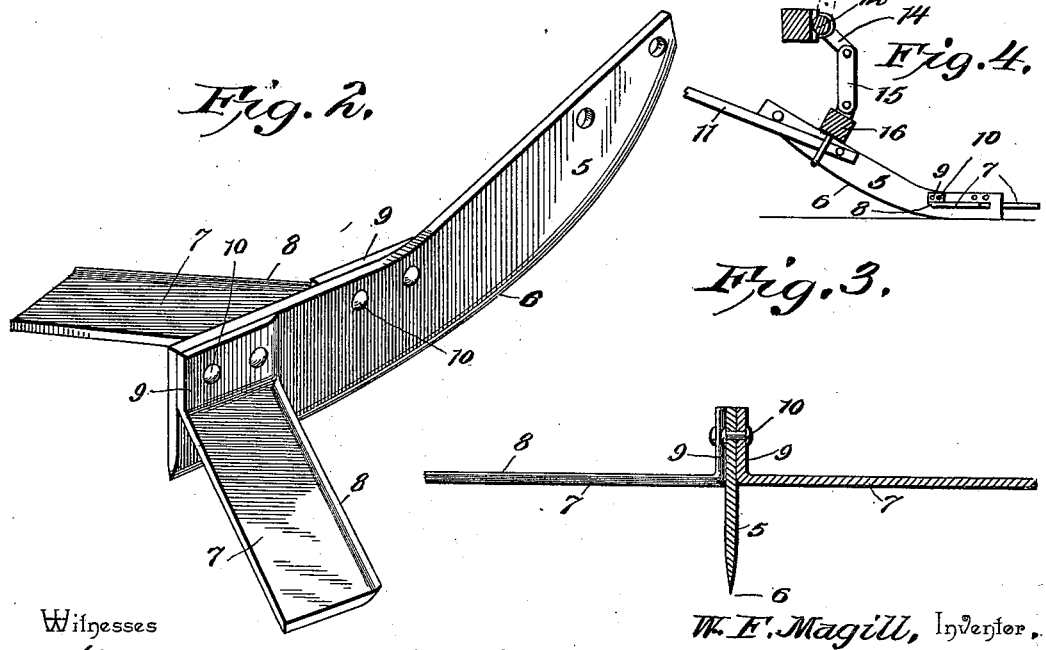
Witnesses
Howard D. Orr.
J. W. Garner
W. F. Magill, Inventor.
By his Attorneys,
C. A. Snow & Co.
THE NORRIS PETERS CO., PHOTO-LITHO., WASHINGTON, D. C.

UNITED STATES PATENT OFFICE.

WILLIAM F. MAGILL, OF DUFUR, OREGON.

CULTIVATOR.

SPECIFICATION forming part of Letters Patent No. 652,853, dated July 3, 1900.

Application filed February 15, 1900. Serial No. 5,377. (No model.)

*To all whom it may concern:*

Be it known that I, WILLIAM F. MAGILL, a citizen of the United States, residing at Dufur, in the county of Wasco and State of Oregon, have invented a new and useful Cultivator, of which the following is a specification.

My invention is an improved cultivator designed especially for killing weeds on and cultivating fallow lands; and it consists in a cutter-blade adapted to be trailed or drawn from its front end, having a cutting edge on its lower side for entering the earth and laterally-disposed cutter-wings on the sides of said cutter-blade, said wings being adapted to operate under the surface of the earth.

My invention further consists in the peculiar construction and combination of devices hereinafter fully set forth, and particularly pointed out in the claims.

In the accompanying drawings, Figure 1 is a top plan view of a cultivator constructed in accordance with my improvements. Fig. 2 is a detail perspective view of one of my improved cultivator devices. Fig. 3 is a detail sectional view of the same on the line 3 3 of Fig. 1 looking rearwardly. Fig. 4 is a diagram illustrating the relative arrangement of one of my cultivating devices and means for raising and lowering the same.

The draft-frame 1, which, as here shown, is provided with supporting-wheels 2, a tongue 3 for the attachment of draft-animals, and a seat 4 for the driver, may be of any suitable preferred construction.

My invention primarily consists in the peculiarly-constructed cultivating device, which may be described as follows: A cutter-blade 5, which, as here shown, is substantially in the form of a runner, but which may be of other suitable form, if preferred, has the lower cutting edge 6, which is adapted to enter the earth. The cutter-blade may be of any preferred length and is adapted to be drawn along in a straight line by suitable connecting devices which attach to it the draft-frame. On the sides of the cutter-blade are arranged laterally-extending cutter-wings 7, which, as shown in the drawings, are preferably adapted to operate horizontally in and below the surface of the earth. Said cutter-wings have cutting edges, as at 8, at their front sides and are upturned at their inner ends, as at 9, which upturned portions 9 bear against opposite sides of the cutter-blade 5 and are secured thereto by bolts or in any other suitable manner, as at 10. The said wings are preferably separable from said cutter-blade for the purposes of sharpening and renewal when necessary or desirable. The cutter-wings are disposed one in advance of the other, as shown, and are obliquely disposed with relation to the cutter-blades and preferably at right angles to each other.

The cultivating device above described when in use operates as follows: The cutter-blade enters the ground to any required depth and tends to advance in a straight line, serving to center and support the cutter-wings and establish a line of draft therefor, the cutter-blade when in operation being depressed a sufficient depth in the earth to cause the cutter-wings to operate below the surface of the earth, and thereby effectually loosen and cultivate the same and also destroy weeds and other growth.

The oblique arrangement of the cutter-wings, hereinbefore described, causes the draft stresses on the oppositely-disposed cutter-wings to counteract each other, and thereby promote the progress of the cutter-blade in a straight line.

As illustrated in Figs. 1 and 3, the front ends of the cutter-blades are connected pivotally to the draft-frame by means of draw-bars 11, or chains or other suitable means may be employed to connect said cutter-blades to the draft-frame. I have also shown in Figs. 1 and 4 a rock-shaft 12, mounted in suitable bearings on the draft-frame, operated by a hand-lever 13, and having arms 14, which are connected by rigid links 15 to a cross-bar 16, attached to and connecting the cutter-blades in series and in parallel relation to each other. This construction and combination of devices provides a means for raising and lowering the cultivating devices and for adjusting the latter so as to cause them to operate at any required depth; but it will be readily understood that other suitable means may be employed for raising, lowering, and adjusting my improved cultivating devices, and hence I do not desire to limit myself to the use of any particular form of means for such purposes in combination with my said improved cultivating devices.

As shown in Fig. 1, the cultivating devices are arranged in series, with the cutter-blades parallel in relation to each other and with the cutter-wings on the opposing sides of said cutter-blades overlapping each other, this arrangement insuring the thorough cultivation of the earth between the cutter-blades.

Having thus described my invention, I claim—

1. In a cultivator, the combination with a draft-frame, of a cutter-blade (one or more) connected at its front end to the draft-frame whereby the cutter-blade is adapted to be drawn or trailed, said cutter-blade having a cutting edge on its lower side extending throughout the length thereof, and provided with laterally-extending cutter-wings on its sides, adapted to operate under the surface of the soil and means to raise and lower said cutter-blade, substantially as described.

2. In a cultivator, the combination with a draft-frame, of a cutter-blade (one or more) connected at its front end to the draft-frame, whereby the cutter-blade is adapted to be drawn or trailed, said cutter-blade having a cutting edge on its lower side extending throughout the length thereof, and provided with laterally-extending cutter-wings on its sides, adapted to operate under the surface of the soil and a lever mounted on the draft-frame and connections between said lever and said cutter-blade, to raise and lower the latter and hold the same when depressed, substantially as described.

3. In a cultivator, the combination with a draft-frame, of a series of trailing cultivator-blades connected at their front ends to the draft-frame and having cutting edges on their lower sides and laterally-projecting cutter-wings on their sides, adapted to operate under the surface of the soil, a bar bearing on and connecting said series of trailing cultivator-blades, a rock-shaft carried by the draft-frame and having rock-arms, a lever to turn said rock-shaft, and links connecting said rock-shaft to said bar, substantially as described.

4. A cultivator cutter-blade or runner adapted to be trailed or drawn from its front end and having the cutting edge on its lower side extending throughout its length, and the laterally-extending cutter-wings on its sides, for the purpose set forth substantially as described.

5. In a cultivator, a series of cutter-blades having cutting edges on their lower sides adapted for entering the earth, and laterally-disposed cutter-wings on the sides of said cutter-blades, adapted to operate under the surface of the earth, the wings on the proximate sides of said series of cutter-blades being disposed in overlapping relation to each other, for the purpose set forth, substantially as described.

In testimony that I claim the foregoing as my own I have hereto affixed my signature in the presence of two witnesses:

WILLIAM F. MAGILL.

Witnesses:
WALDO BRIGHAM,
A. J. BRIGHAM.